United States Patent [19]

Tolmie

[11] Patent Number: 5,352,252
[45] Date of Patent: Oct. 4, 1994

[54] PROCESS FOR MAKING FUEL CUBES FROM STRAW

[76] Inventor: Richard W. Tolmie, 5464 Kalama River Rd., Kalama, Wash. 98625

[21] Appl. No.: 181,622

[22] Filed: Dec. 7, 1993

[51] Int. Cl.$^5$ .............................................. C01L 5/00
[52] U.S. Cl. .................................... 44/580; 44/589; 44/594; 44/596; 44/605
[58] Field of Search ............... 44/580, 589, 594, 596, 44/605, 551

[56] References Cited

U.S. PATENT DOCUMENTS

| | | | |
|---|---|---|---|
| 233,884 | 11/1880 | Smith | 44/580 |
| 744,584 | 11/1903 | Mellinger | 44/580 |
| 1,003,296 | 9/1911 | Ryan | 44/596 |
| 1,668,660 | 5/1928 | Shimamoto | 44/580 |
| 2,270,288 | 1/1942 | Goss | 44/589 |
| 4,496,365 | 1/1985 | Lindemann | 44/589 |

FOREIGN PATENT DOCUMENTS 146735 3/1981 Fed. Rep. of Germany.

Primary Examiner—Stephen Kalafut
Assistant Examiner—Cephia D. Toomer
Attorney, Agent, or Firm—Chernoff, Vilhauer, McClung & Stenzel

[57] ABSTRACT

A process for making fuel cubes from straw includes the steps of drying and cutting the straw, adding lime to the straw and applying ammonia to the straw. The straw is then placed in a densification machine or cuber where solid bricks are formed. The ammonia breaks down the natural crystalline lattice structure of the straw's cellulose thus allowing it to be compacted.

4 Claims, 1 Drawing Sheet

PROCESS FOR MAKING FUEL CUBES FROM STRAW

BACKGROUND OF THE INVENTION

It has long been a desired object to convert straw left over from the harvesting of wheat, rice, oats, barley, rye, and sugar cane grass-type straws into a source of fuel. Many areas of the world do not have abundant forests and/or minerals capable of producing fuel but have grazing areas in abundance from which straw or grasses may be produced.

The only practical way to use straw as a fuel is to compress it into dense cubes or bricks. Bales are not suitable for efficient fuel use. Loose straw or large bales of straw or grass pose many problems for most fuel systems, such as handling and introduction into the combustor. Most solid fuel combustors are designed to handle coal or chunk type fuels that can be conveyed, stored, and metered using augers or chain conveyors. Holding areas (solos and bunkers), preparation machinery (grinders and pulverizers), and metering systems cannot handle loose straw, grass or even bales (approx. 3'×2'×1.5' to 4'×4'×8'). Pulverization equipment such as grinder-blowers or ball mills for solid fuel injection systems, are all designed to handle heavy, solid chunk type fuels such as coal.

Actual combustion is also a problem for loose fuel. Solid fuel combustors traditionally have zones designed for maximum efficiency which are usually 2 to 8 feet above the bed of the combustor. Loose or light fuels entering the combustor fly up into the vapor space, burning out of the zone for maximum efficiency and causing problems with the economizers and multi-clone systems. Chunk or cube type fuels with a unit density of up to 60 pounds per cubic foot drop into and stay in the bed area releasing heat in the zone designed for maximum efficiency.

Attempts to make cubes from straw or grass, have, however thus far met with failure. Straw and grass has a crystalline lattice structure in the cellulose and will not stay compacted even after being subjected to intense pressure. In the past, attempts have been made to make straw or grass cubes by adding various chemicals to the straw prior to feeding the straw or grass into a cuber or densification machine.

For example, calcium ligno-sulfonate, bentonite, dolomite, and calcium hydroxide have all been added to straw in an attempt to aid in the formation of dense cubes which could be then used as a fuel. Each additive has drawbacks. For example, calcium ligno-sulfonate melts and becomes too gummy to form a good cube and forms a residue that causes the cubers or densification machines to be hard to start after cooling. Cubes made with bentonite do not hold together well unless a very high percentage is used. This is impractical, first because of the cost involved, and also because these high percentages of bentonite are very abrasive and wear out the dies and internal parts of the cubers very rapidly. Also, bentonite and bentonite-type binders are based on diatomaceous earth and their use in high percentages results in a fuel with a very high ash content. Calcium hydroxide will not produce a good quality cube unless used in percentages usually exceeding 10% to 15%. The costs associated with this chemical become prohibitive at these use levels.

Thus, to date all efforts to make cubes from straw and grasses have been unsuccessful because the material added to the straw to make it bind together either makes unsatisfactory cubes or prevents the densification machine from operating correctly.

Densification machines of this type are more commonly known as cubers or pelletizers. These devices make compacted cubes of material by forcing loose fluffy starter material through an array comprising a ring of dies under intense pressure. Material is usually fed into a mixer from which it is forced into the path of a press wheel which pushes the material through a die array. Conventional cubers of this type are manufactured by Warren & Baerg Company of Dinuba, California. Pellet machines are manufactured by various companies including California Pellet Mills.

SUMMARY OF THE INVENTION

It has been discovered by the inventors herein that the addition of ammonia to straw just prior depositing the straw into the mixer of a densification machine allows the densifier to make compacted fuel cubes of straws such as rye grass or wheat straw. According to the process of the invention, the straw is first dried and then ground to a maximum length of about 3 inches. The straw is then deposited on the conveyor belt and an applicator applies lime as the ground straw moves along the belt. Next, ammonia is applied to the straw just prior to deposit of the straw by the conveyor belt into the mixer of a densification machine. The densification machine then forces the straw through the dies to make fuel cubes.

It is believed that the function of the ammonia is to weaken the partially crystalline lattice structure of the cellulose allowing the straw to be compressed and stay in the cube form. As a result, fuel cubes are made by the densification machine which are compact and possess the unit density needed to provide efficient fuel.

The foregoing and other objectives, features, and advantages of the invention will be more readily understood upon consideration of the following detailed description of the invention, taken in conjunction with the accompanying drawing.

DETAILED DESCRIPTION OF THE PREFERRED EMBODIMENT

Figure 1:
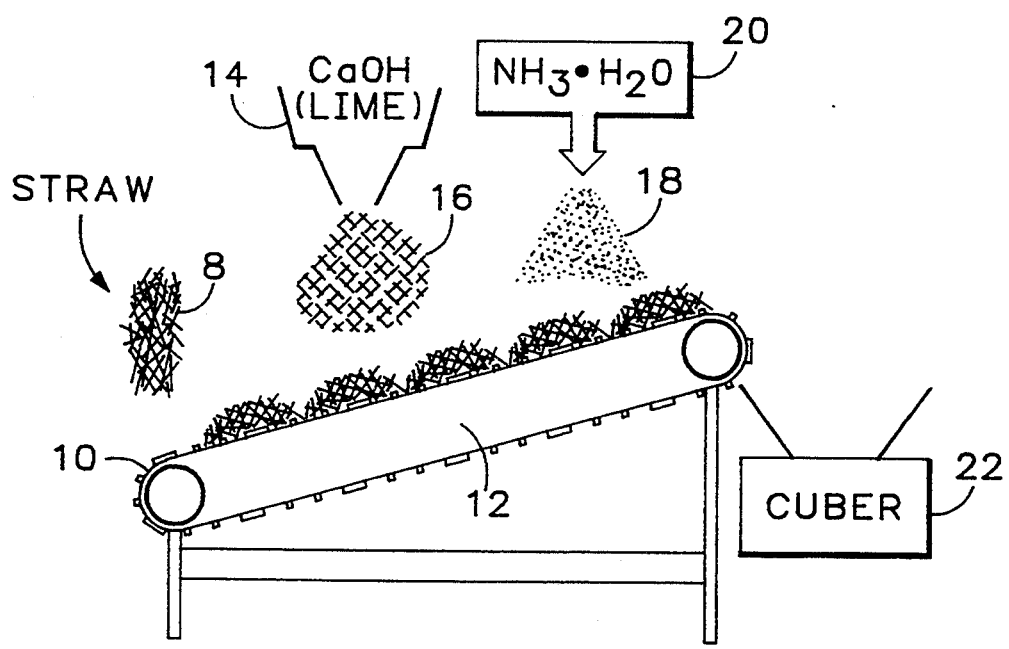
FIG. 1 is a schematic diagram illustrating the process of the invention.

First the straw to be processed is dried in a dryer (not shown) or naturally with sun and air until the moisture content of the straw lies within a range of about 10% to 18%. The optimum moisture content is about 14%. Referring to FIG. 1, straw 8, which has been ground or chopped to a length not exceeding 3 inches by a grinder or other apparatus (not shown), is deposited on the end 10 of a conveyor belt 12. As the straw 8 moves along the conveyor belt 12 an applicator 14 applies lime 16 to the straw. The amount of lime varies with the species of the straw or grass but generally lies within a range of 2% to 7% lime to straw by weight. The optimum ratio of lime to straw is usually about 4%. Next ammonia 18 is applied from a dispenser 20 directly onto the straw as it moves up the conveyor belt 12. The easiest way to apply the ammonia is in a spray mist using aqueous ammonia, however anhydrous ammonia can also be used. The amount of ammonia applied lies in the range of between two gallons to five gallons per ton of straw.

The straw is then deposited off of the conveyor into a conventional cubing machine or densification machine 22 where it is compacted under intense pressure by forcing the straw through radial dies having a generally round or rectangular cross section by use of a press wheel or the like to make a cube of about 30–60 lbs/ft$^3$ unit density.

Combined with the intense heat generated by the pressure of the press wheel, the ammonia apparently weakens the crystalline lattice structure of the cellulose in the straw and allows it to form thereby permitting the formation of a cube having a unit density sufficient to provide an efficient burning fuel.

The lime in the cube acts as a binder becoming a glue-like substance under the heat of hydration, and friction caused by the compaction of the straw through the cuber's dies. This holds the cube in a dense compact form. The density of the cube thus formed is fairly high, lying in a range of 30–60 lbs/cubic foot. This produces fuel bricks of sufficient density to be used in conventional furnaces.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A process for forming a combustible fuel cube from straw or grass comprising the steps of:
    (a) drying the straw;
    (b) cutting the straw to a length not to exceed 3 inches;
    (c) applying lime to the straw;
    (d) applying ammonia to the straw; and
    (e) compressing the straw into dense bricks or cubes.

2. The process of claim 1 wherein the amount of ammonia applied to the straw lies in the range of two to five gallons per ton of straw.

3. The process of claim 2 wherein the amount of lime applied to the straw lies in a range of between 2% and 7% by weight.

4. The process of claim 2 wherein the straw is dried so as to have a moisture content of between 10% and 18%.

* * * * *